US011019370B2

(12) United States Patent
Lechner et al.

(10) Patent No.: US 11,019,370 B2
(45) Date of Patent: *May 25, 2021

(54) CHANNEL USAGE MANAGEMENT IN TERRESTRIAL DISTRIBUTION SYSTEMS

(71) Applicant: Verizon Patent and Licensing Inc., Washington, DC (US)

(72) Inventors: Marcelo D. Lechner, Burlington, MA (US); Glenn Altchek, Lawrenceville, NJ (US); Aakash Chokshi, New York, NY (US); Srinivas Anumala, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,457

(22) Filed: Feb. 26, 2020

(65) Prior Publication Data
US 2020/0195986 A1    Jun. 18, 2020

Related U.S. Application Data

(63) Continuation of application No. 16/105,343, filed on Aug. 20, 2018, now Pat. No. 10,616,615.

(51) Int. Cl.
*H04N 21/234* (2011.01)
*H04N 21/61* (2011.01)
*H04N 21/258* (2011.01)
*H04N 21/81* (2011.01)

(52) U.S. Cl.
CPC . *H04N 21/23424* (2013.01); *H04N 21/25883* (2013.01); *H04N 21/6112* (2013.01); *H04N 21/812* (2013.01)

(58) Field of Classification Search
CPC ....... H04N 21/23424; H04N 21/25883; H04N 21/6112; H04N 21/812
See application file for complete search history.

(56) References Cited

U.S. PATENT DOCUMENTS

| | | | |
|---|---|---|---|
| 2010/0070996 A1 | 3/2010 | Liao et al. | |
| 2011/0016479 A1 | 1/2011 | Tidwell et al. | |
| 2012/0310745 A1* | 12/2012 | Bhatia | G06Q 30/02 705/14.66 |
| 2015/0304698 A1 | 10/2015 | Redol | |

* cited by examiner

*Primary Examiner* — Randy A Flynn

(57) ABSTRACT

Devices, methods, and storage media provide for identifying, by an ad insertion device, at least one prospect for inserting a selected ad via a set of hidden channels during a target programming timeslot based on ad schedules for a plurality of networks; determining based on hidden channel usage data for a programming timeslot corresponding to the target programming timeslot, that a likelihood of availability of at least one hidden channel of the set of hidden channels during the target programming timeslot exceeds a first threshold level; and sending an instruction to an interface device to insert the selected ad via the at least one hidden channel during the target programming timeslot.

20 Claims, 6 Drawing Sheets

| | DAY 1 | DAY 2 | DAY 3 | DAY 4 | DAY 5 | DAY 6 | DAY 7 | DAY 8 | DAY 9 |
|---|---|---|---|---|---|---|---|---|---|
| SITE X | 0.81% | 0.37% | 0.37% | 0.58% | 0.33% | 0.36% | 0.45% | 0.73% | 0.59% |
| 0000 | 0.00% | 0.00% | 0.00% | 0.00% | 0.00% | 0.00% | 0.00% | 0.00% | 0.00% |
| 0100 | 0.00% | 0.00% | 0.00% | 0.00% | 0.00% | 0.00% | 0.00% | 0.00% | 0.00% |
| 0200 | 0.00% | 0.00% | 0.00% | 6.08% | 0.00% | 0.00% | 0.00% | 0.00% | 0.00% |
| 0300 | 0.00% | 0.00% | 0.00% | 0.00% | 0.00% | 0.00% | 0.00% | 0.00% | 0.00% |
| 0400 | 0.00% | 0.00% | 0.00% | 0.00% | 0.00% | 0.00% | 0.00% | 0.00% | 0.00% |
| 0500 | 1.16% | 2.54% | 0.00% | 0.00% | 0.00% | 0.00% | 0.00% | 3.20% | 0.00% |
| 0600 | 9.66% | 4.13% | 5.76% | 6.51% | 4.91% | 1.47% | 6.72% | 4.91% | 5.76% |
| 0700 | 2.63% | 0.00% | 0.00% | 0.00% | 0.00% | 2.36% | 0.00% | 0.00% | 0.00% |
| 0800 | 0.00% | 0.00% | 0.00% | 0.00% | 0.00% | 0.00% | 0.00% | 0.00% | 0.00% |
| 0900 | 0.00% | 0.00% | 0.00% | 0.00% | 0.00% | 0.00% | 0.00% | 0.00% | 0.00% |
| 1000 | 0.00% | 0.00% | 0.00% | 0.00% | 0.00% | 0.00% | 0.00% | 0.00% | 0.00% |
| 1100 | 0.00% | 0.00% | 0.00% | 0.00% | 0.00% | 0.00% | 0.00% | 0.00% | 0.00% |
| 1200 | 0.00% | 0.00% | 0.00% | 0.00% | 0.00% | 0.00% | 0.00% | 0.00% | 0.00% |
| 1300 | 0.00% | 0.00% | 0.00% | 0.00% | 0.00% | 0.00% | 0.00% | 0.00% | 0.00% |
| 1400 | 0.00% | 0.00% | 0.00% | 0.00% | 0.00% | 0.00% | 0.00% | 0.00% | 0.00% |
| 1500 | 0.00% | 0.00% | 0.00% | 0.00% | 0.00% | 0.00% | 0.00% | 0.00% | 0.00% |
| 1600 | 0.00% | 0.00% | 0.00% | 0.00% | 0.00% | 0.00% | 0.00% | 0.00% | 0.00% |
| 1700 | 0.00% | 0.00% | 0.00% | 0.00% | 0.00% | 3.74% | 0.00% | 0.00% | 0.00% |
| 1800 | 0.00% | 0.00% | 0.00% | 0.00% | 0.00% | 0.00% | 0.00% | 0.00% | 0.00% |
| 1900 | 0.00% | 0.00% | 0.00% | 0.00% | 0.00% | 0.00% | 0.00% | 0.00% | 0.00% |
| 2000 | 0.00% | 0.00% | 0.00% | 0.00% | 0.00% | 0.00% | 0.00% | 0.00% | 0.00% |
| 2100 | 0.00% | 0.00% | 0.00% | 0.00% | 0.00% | 0.00% | 0.00% | 0.00% | 0.00% |
| 2200 | 0.00% | 0.00% | 0.00% | 0.00% | 0.00% | 0.00% | 0.00% | 0.00% | 0.00% |
| 2300 | 0.00% | 0.00% | 0.00% | 0.00% | 0.00% | 0.00% | 0.00% | 0.00% | 0.00% |

200

| | DAY 1 | DAY 2 | DAY 3 | DAY 4 | DAY 5 | DAY 6 | DAY 7 | DAY 8 | DAY 9 |
|---|---|---|---|---|---|---|---|---|---|
| SITE X | 9.66% | 4.13% | 5.76% | 6.51% | 4.91% | 1.47% | 6.72% | 4.91% | 5.76% |
| 06:00:00 | 0.00% | 0.00% | 0.00% | 0.00% | 0.00% | 0.00% | 0.00% | 0.00% | 0.00% |
| 06:02:00 | 0.00% | 0.00% | 0.00% | 0.00% | 0.00% | 0.00% | 0.00% | 0.00% | 0.00% |
| 06:04:00 | 0.00% | 0.00% | 0.00% | 0.00% | 0.00% | 0.00% | 0.00% | 0.00% | 0.00% |
| 06:06:00 | 0.00% | 0.00% | 0.00% | 0.00% | 0.00% | 0.00% | 0.00% | 0.00% | 0.00% |
| 06:08:00 | 0.00% | 0.00% | 0.00% | 0.00% | 0.00% | 0.00% | 0.00% | 0.00% | 0.00% |
| 06:10:00 | 0.00% | 0.00% | 0.00% | 0.00% | 0.00% | 0.00% | 0.00% | 0.00% | 0.00% |
| 06:12:00 | 0.00% | 0.00% | 0.00% | 0.00% | 0.00% | 0.00% | 0.00% | 0.00% | 0.00% |
| 06:14:00 | 25.00% | 25.00% | 75.00% | 50.00% | 10.00% | 40.00% | 20.00% | 35.00% | 30.00% |
| 06:16:00 | 0.00% | 0.00% | 0.00% | 0.00% | 0.00% | 0.00% | 0.00% | 0.00% | 0.00% |
| 06:18:59 | 0.00% | 0.00% | 0.00% | 0.00% | 0.00% | 0.00% | 0.00% | 0.00% | 0.00% |
| 06:20:00 | 0.00% | 0.00% | 0.00% | 0.00% | 0.00% | 0.00% | 0.00% | 0.00% | 0.00% |
| 06:22:00 | 0.00% | 0.00% | 0.00% | 0.00% | 0.00% | 0.00% | 0.00% | 0.00% | 0.00% |
| 06:24:00 | 0.00% | 0.00% | 0.00% | 0.00% | 0.00% | 0.00% | 0.00% | 0.00% | 0.00% |
| 06:26:00 | 0.00% | 0.00% | 0.00% | 0.00% | 0.00% | 0.00% | 0.00% | 0.00% | 0.00% |
| 06:28:00 | 0.00% | 0.00% | 0.00% | 0.00% | 0.00% | 0.00% | 0.00% | 0.00% | 0.00% |
| 06:30:00 | 0.00% | 0.00% | 0.00% | 0.00% | 0.00% | 0.00% | 0.00% | 0.00% | 0.00% |
| 06:32:00 | 0.00% | 0.00% | 0.00% | 0.00% | 0.00% | 0.00% | 0.00% | 0.00% | 0.00% |
| 06:34:00 | 0.00% | 0.00% | 0.00% | 0.00% | 0.00% | 0.00% | 0.00% | 0.00% | 0.00% |
| 06:36:00 | 0.00% | 0.00% | 0.00% | 0.00% | 0.00% | 0.00% | 0.00% | 0.00% | 0.00% |
| 06:38:00 | 0.00% | 0.00% | 0.00% | 0.00% | 0.00% | 0.00% | 0.00% | 0.00% | 0.00% |
| 06:40:00 | 0.00% | 0.00% | 0.00% | 0.00% | 0.00% | 0.00% | 0.00% | 0.00% | 0.00% |
| 06:42:00 | 0.00% | 0.00% | 0.00% | 0.00% | 0.00% | 0.00% | 0.00% | 0.00% | 0.00% |
| 06:44:00 | 0.00% | 0.00% | 0.00% | 0.00% | 0.00% | 0.00% | 0.00% | 0.00% | 0.00% |
| 06:46:00 | 0.00% | 0.00% | 0.00% | 0.00% | 0.00% | 0.00% | 0.00% | 0.00% | 0.00% |
| 06:48:00 | 0.00% | 0.00% | 0.00% | 0.00% | 0.00% | 0.00% | 0.00% | 0.00% | 0.00% |
| 06:50:00 | 0.00% | 0.00% | 0.00% | 0.00% | 0.00% | 0.00% | 0.00% | 0.00% | 0.00% |
| 06:52:00 | 0.00% | 0.00% | 0.00% | 0.00% | 0.00% | 0.00% | 0.00% | 0.00% | 0.00% |
| 06:54:00 | 0.00% | 0.00% | 0.00% | 0.00% | 0.00% | 0.00% | 0.00% | 0.00% | 0.00% |
| 06:56:00 | 0.00% | 0.00% | 0.00% | 0.00% | 0.00% | 0.00% | 0.00% | 0.00% | 0.00% |
| 06:58:00 | 0.00% | 0.00% | 0.00% | 0.00% | 0.00% | 0.00% | 0.00% | 0.00% | 0.00% |

Fig. 2

CHANNEL USAGE MANAGEMENT IN TERRESTRIAL DISTRIBUTION SYSTEMS

CROSS REFERENCE TO RELATED APPLICATIONS

This patent application is a continuation of U.S. patent application Ser. No. 16/105,343, filed on Aug. 20, 2018, the contents of which are hereby incorporated by reference in their entirety.

BACKGROUND

Terrestrial distribution systems for television content provide users with TV network programming offering news, entertainment, sports, local programming, national programming, etc., via interface devices, such as set-top boxes. Additionally, such distribution systems are configured to deliver a limited number of advertisements (approximately 2 minutes per nominal hour of programming) during network-designated breaks in programming. With linear TV, a multichannel video programming distributor (MVPD) manages use of a limited number of insertion channels during indeterminate break times, across the networks in the MVPD's network channel lineup.

DESCRIPTION OF THE DRAWINGS

FIGS. 1 and 2 are tables illustrating exemplary ad collision data;

DETAILED DESCRIPTION

Figure 1:

The following detailed description refers to the accompanying drawings. The same reference numbers in different drawings may identify the same or similar elements.

An MVPD or multi-system operator (MSO) may have the option to monetize allotted ad inventory sold/granted to the MSO by inserting different types of ads during scheduled break times designated by the networks using cue and timing information in the program feed. One such ad spot, a designated market area (DMA) (or regional) ad copy, may be spliced into the network program's main feed at a distribution site, for example, and delivered "indiscriminately" to all of the customers' set-top boxes in a region served by the distribution site. Another spot type, a sub-DMA (or local) ad copy, may be inserted by the MSO's distribution system using a different hidden channel via the customers' set-top boxes in each local, geographic-based zone. With a third spot type, different addressable (impression-based or household-level) ad copies, may be respectively inserted by the MSO's distribution system over a different hidden channel via the customers' set-top boxes in each demographic-based segment, as part of a targeted ad campaign. When an MSO—for whatever reason—does not insert in a particular break (and also elects not to insert a marketing ad), the MSO fails to monetize that particular break.

The MSO's distribution system may have an infrastructure with a limited number of hidden channels over which the sub-DMA ads and the addressable ads may be delivered simultaneously (insertion capacity). That is, the hidden channels may handle a limited number of simultaneous ad insertion requests (a single ad copy delivered per hidden channel at a time). When, at any point in the network programming, a total number of ad insertion requests exceed the insertion capacity, a collision condition occurs—i.e., one or more of the networks go to break but no hidden channel is available to deliver the corresponding ad—resulting in the set-top box staying tuned to the network's main feed channel. Collisions are particularly problematic for the MSO when the ad that fails to air is a sub-DMA ad, given that an MSO may be contractually committed to insert a specified number of sub-DMA ads at prescribed times of day, on identified networks and/or programs. Further, ad collisions result in operational inefficiencies and the misallocation of distribution system resources.

Because programming breaks (or "ad breaks") on multiple networks may occur at any time within a time window during a program (e.g., 30 minutes, an hour, etc.) from day-to-day, the MVPD may elect to conservatively set the number of networks configured to insert at any point in the TV programming. Although this practice may decrease the likelihood of incurring a collision, throughout much of the TV programming cycle extra insertion channel capacity exists—the set of insertion channels is underused—and thus some ad inventory goes unused, resulting in the inefficient use of distribution system resources.

The term "program" includes video and/or audio content. A program may include, for example, a local program, a national program, a television show, a movie, a sporting event, a news program, a musical event, or an audio program (e.g., a program that plays music).

The term "ad" includes video content, audio content, video and audio content, interactive elements, and/or other forms of content. An ad may include, for example, a commercial, an audio voiceover, a promotion for a program, a marketing spot, and/or other type of advertisement.

The terms "insertion channel," "hidden channel," and/or "black channel" are used interchangeably and include digital TV channels using, for example, quadrature amplitude modulation (QAM) or another standard, and may be tuned to by the set-top box but not by the user (and thus are "hidden"). These channels, when not used for insertion, may not carry any feed (and thus are "black").

In embodiments described herein, an MSO distribution system may record historical collision data for configurable time periods (e.g., 30 secs., 1 min., 90 secs., 2 mins., etc.) throughout an hour for a day of the week. The MSO distribution system may use the data to calculate a likelihood of hidden channel availability for an upcoming corresponding timeslot. Based on the likelihood of collision for the upcoming corresponding timeslot, the MSO distribution system may decide to configure/not configure one or more additional networks for ad insertion for an upcoming corresponding programming cycle.

As an example, assume that an MSO distribution system collects data over a multi-day period and generates a plurality of collision reports for any number of network channels (i.e., networks and/or network pairs (standard definition and high definition)) distributed by MSO distribution site X. FIG. 1 is a table illustrating an exemplary ad collision report 100 across a channel lineup which may be generated, for example, by ad inventory unit 400 based on collision data received from ad collision data DB 440. In other embodiments, ad inventory unit 400 may obtain collision report 100 from ad collision data DB 440.

Referring to FIG. 1, ad collision report 100 may include entries of recorded data for a distribution site "X," over a period of 9 previous programming cycles (e.g., days of the week). In one embodiment, the number of programming cycles used to generate the collision report is configurable. As illustrated, each day (column) includes 24, 60-min. time intervals corresponding to hours of the day (e.g., 0600=6 a.m., 1500=1 p.m., etc.). Entries in the table indicate the percentage of scheduled ads (local zone or addressable), over the MSO's channel lineup, for which no insertion channel was available to deliver a scheduled ad in response to a cue tone in the network feed on the network channel.

For example, during the 24-hr period of Day 4, collision report 100 indicates that 0.58% of the scheduled ads across the network channel lineup were not delivered over one or more networks due to ad collisions, while for Day 7, 0.45% of the scheduled ads went undelivered, and so on. Collision report 100 indicates that ad collisions occurred in the 6:00 a.m. hour on each day (Day 1-Day 9), and that no ad collisions occurred on any of the days, for example, from 8:00 a.m. to 5:00 p.m. (i.e., 1700), or from 6:00 p.m. (i.e., 1800) to midnight (i.e., 0000).

In some embodiments, collected collision data may be reported using multiple levels of granularity, for example, as illustrated in ad collision report 200 shown in FIG. 2. In one embodiment, ad inventory unit 400, or another device, may present the collision data into increasingly shorter time periods. FIG. 2 illustrates a collision report 200 depicting the collision data from the 6 o'clock hour of collision report 100. Collision report 200 shows collision data recorded over 2 min. intervals, in which the observed time interval beginning at 14 mins after the hour indicates collisions occurring on all 9 days. In some embodiments, this information may be used to identify potential ad-spot insertion in an upcoming programming timeslot, for instance, between 6:30-7:00 a.m., and/or to rule out ad-spot insertion, for instance, between 6:00-6:30 a.m., as described below.

According to an exemplary embodiment, networks and/or program content providers provide cue and timing information pertaining to ad-insertion spots to MSOs (or MVPDs). For example, cue and timing information may be embedded into program data that indicates a program break.

According to an exemplary embodiment, an ad insertion platform of a TV distribution system is configured to receive schedules for DMA and sub-DMA ad spots that approximate timeslots for ad insertion for an upcoming programming period (e.g., 06:00:00-06:59:59) across a channel lineup. According to an exemplary embodiment, the ad insertion platform may use the ad schedules to identify at least one opportunity to insert an addressable ad (e.g., for a particular impression-based ad campaign) via a set of hidden channels during the upcoming programming period for the channel lineup.

According to an exemplary embodiment, the ad insertion platform may retrieve from a database, hidden channel usage (e.g., for sub-DMA ad insertion) data for previous programming periods that correspond to the upcoming programming period. As an example, a distribution system that serves 5 local zones may have a total of 50 hidden channels. Assume that on 9 previous days, at 06:14:00, 10 networks of the channel lineup (e.g., up to 500+ networks) were on a local ad break. So, 50 hidden channels (10 networks×5 local zones) out of the 50 hidden channels were in use at 06:14:00. Thus, the hidden channel usage database will record no (zero) hidden channels as being idle (i.e., available) at 06:14:00. Further assume that on the previous 9 days, at 06:44:00, no (zero) networks of the channel lineup (e.g., 40 channels) were on a local ad break. Thus, the hidden channel usage database will record 50 hidden channels as being idle (i.e., available) at 06:44:00. The database may aggregate such information for a configurable time period (e.g., 10 secs., 30 secs., 1 min., etc.) of an entire programming day, for multiple days, weeks, and/or months.

According to an exemplary embodiment, the ad insertion platform may determine a likelihood of availability of hidden channel capacity during upcoming programming cycles (e.g., 06:14:00, 06:44:00, etc.).

According to an exemplary embodiment, the ad insertion platform may retrieve from a collisions database, records of any collision that may have occurred during specified configurable time periods. Again, assume that the distribution system has a total of 50 hidden channels and serves 5 local zones, so that up to 10 networks in the channel lineup can go to break at any one time. Further assume that at 06:14:00 on a particular day, of the nine-day monitoring period, 11 of the networks go to break. The distribution system will grant the first 10 insertions requests it receives, and the 11th insertion request will be denied, and one collision will be recorded in the collisions database for the 11th network since no hidden channels are available to service the ad break (i.e., users' set-top boxes will remain tuned to the network feed channel). Further assume that at 06:44:00 on the particular day, of the nine-day monitoring period, none of the networks go to break, so that no collision occurs and a zero is recorded.

According to an exemplary embodiment, the ad insertion platform may determine, based on the collision data, a likelihood of a collision occurring on the set of hidden channels during the upcoming programming period. According to an exemplary embodiment, the ad insertion platform may, after a determination that the likelihood is minimal, for example, at 06:44:00, send an instruction to a set-top box to insert the addressable ad over a network during the upcoming programming period at 06:44:00.

Although FIGS. 1 and 2 illustrate an exemplary collision reports 100/200 for a distribution site, according to other embodiments, collision reports 100/200 may include data other than that described and illustrated in FIGS. 1 and 2, and/or may be contained in any format other than the tabular format illustrated. For example, collision reports 100/200 may include collision data corresponding to specified networks and/or network program.

Figure 3:
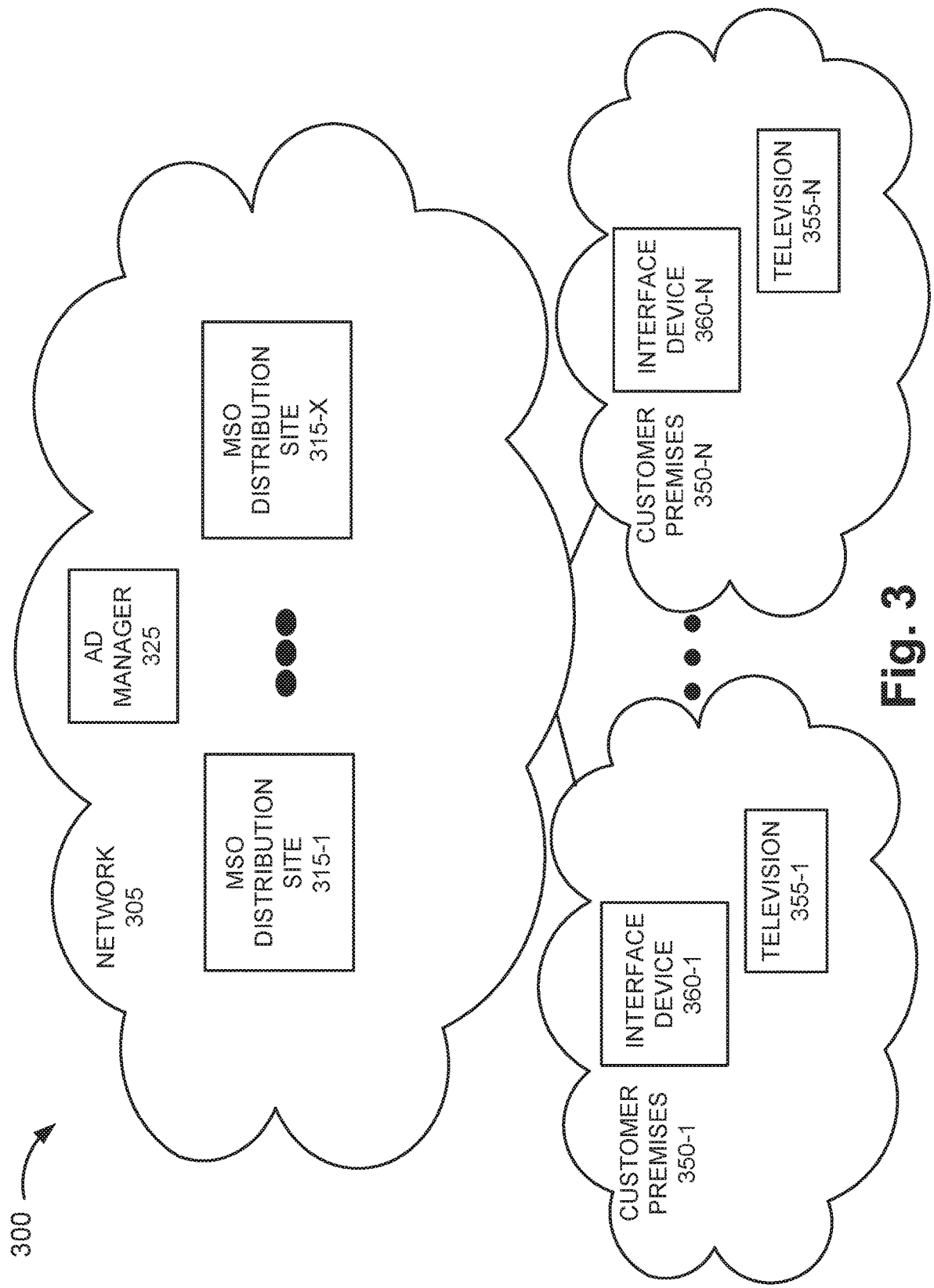
FIG. 3 is a diagram illustrating an exemplary environment in which an exemplary embodiment of ad insertion management may be implemented.

FIG. 3 is a diagram illustrating an exemplary environment in which an exemplary embodiment of collision-reduced ad insertion may be implemented. As illustrated in FIG. 3, environment 300 includes network 305 and customer premises 350-1 through 350-N (also referred to collectively and individually as customer premises 350). Network 305 may include MSO distribution sites 315-1 through 315-X (also referred to collectively as MSO distribution sites 315 or individually as MSO distribution site 315), and an ad manager 325. Customer premises 350 may include televisions (TVs) 355-1 through 355-N (also referred to collectively as televisions 355 or individually as television 355), and interface devices 360-1 through 360-N (also referred to collectively as interface devices 360 or interface device 360).

The number of devices and the configuration in environment 300 are exemplary and provided for simplicity.

According to other embodiments, environment 300 may include additional devices, fewer devices, different devices, and/or differently arranged devices, than those illustrated in FIG. 3. For example, according to other embodiments, a single device in FIG. 3 may be implemented as multiple devices. By way of example, ad manager 325 may be implemented as multiple devices, as discussed below in reference to FIG. 4. Additionally, or alternatively, according to other embodiments, multiple devices may be implemented as a single device. By way of example, television 355 and interface device 360 may be implemented as a single device. Additionally, or alternatively, customer premises 350 may include, for example, a wireless router, a computer, and/or another type of communicative device.

Additionally, or alternatively, environment 300 may include additional networks and/or differently arranged networks than those illustrated in FIG. 3. For example, environment 300 may include other types of network(s), such as a program provider network, an ad provider network, the Internet, etc. Additionally, or alternatively, customer premises 350 may include a local area network (LAN).

A device may be implemented according to a centralized computing architecture, a distributed computing architecture, or a cloud computing architecture. Additionally, a device may be implemented according to one or multiple network architectures (e.g., a client device, a server device, a peer device, or a combination thereof). Also, according to other embodiments, one or more functions and/or processes described as being performed by a particular device may be performed by a different device, or some combination of devices, which may or may not include the particular device.

Environment 300 may be implemented to include wired and/or wireless connections among the devices and the network illustrated. A connection may be direct or indirect and involve intermediary device(s) and/or network(s) not illustrated in FIG. 3.

Network 305 may include one or multiple networks that distribute or make available programs and ads. Network 305 may be implemented as a terrestrial-based network. According to an exemplary embodiment, network 305 may be implemented as a TV network distribution network. According to other embodiments, network 305 and/or portions of network 305 may be implemented as a mobile network, a network associated with the Internet, and/or other suitable network(s).

MSO distribution site 315 may include devices to distribute programs and/or ads to a regional geographic area (e.g., DMA), to multiple local zones (e.g., sub-DMA) of the DMA, and/or to demographic-based segments within the DMA. In some embodiments, MSO distribution site 315 may be implemented as a regional distribution site. MSO distribution site 315 may include various devices, such as, for example, content servers, search servers, load balancers, databases, and transport devices (e.g., routers, switches, etc.). Alternatively, MSO distribution site 315 may be implemented as other types of infrastructures, which may or may not include regional and/or local zones that provide, for example, program and ad acquisition (e.g., a content center), program and ad processing, and program and/or ad distribution.

Ad manager 325 may include a network device that manages ad inventories (e.g., sub-DMA and/or addressable ads) to be inserted into an ad-insertion spot. According to an exemplary embodiment, ad manager 325 may identify opportunities for ad insertion in a network programming break. By way of example, ad manager 325 may be implemented as a computer or other type of computational device. Ad manager 325 is described in further detail below. Although ad manager 325 is illustrated in FIG. 3 as residing outside of MSO distribution site 315, according to other embodiments, ad manager 325 may be implemented as a network device within one or more MSO distribution site 315. Alternatively, ad manager 325 and/or portions of ad manager 325 may not be a part of network 305. For example, ad manager 325 may be an Internet-connected server and/or platform.

Each customer premises 350 may correspond to a location where a customer receives service from network 305. For example, the customer may receive service at home, at work, or at locations where the customer is mobile. Each customer premises 350 includes one or multiple devices that allow the customer to receive program content and/or ads. For example, in a home setting, customer premises 350 may include television 355, interface device 360, and/or any peripheral device (e.g., remote control, sound system, etc.). Additionally, according to other embodiments, customer premises 350 may include various devices to allow the user to receive programs via terrestrial service, as described herein. According to another example, in a mobile setting, customer premises 350 may include a mobile device (e.g., a smartphone, a tablet device, a laptop computer, etc.). Alternatively, in a work setting, customer premises 350 may include a desktop computer or some other suitable user device.

Television 355 may include a device to display programs and/or ads. According to an exemplary implementation, television 355 may correspond to a television. Alternatively, television 355 may be implemented as other types of display devices, such as, for example, a monitor, a mobile device having a display, etc. According to an exemplary embodiment, television 355 and interface device 360 may be separate devices, as illustrated in FIG. 3. According to other embodiments, television 355 may include interface device 360 or include some of the functionalities provided by interface device 360.

Interface device 360 includes a device that communicates with network 305 to receive programs and ads. According to an exemplary implementation, interface device 360 may be implemented as a set-top box. The set-top box may include a client device, a thin client device, a converter box, a receiver device, a server device, a peer device, a tuner device, and/or a digibox. According to an exemplary embodiment, interface device 360 includes a device that receives program content and/or ad data from, for example, ad manager 325. In one embodiment, ad data may include instructions for switching from a network's main feed channel to a hidden channel—imperceptibly to a viewer—to present an ad copy during a network-designated programming break, and tune back to the main feed at break's end. In one embodiment, interface device 360 is associated with (e.g., registered to) a subscriber profile of a subscriber to the MVPD's TV services. In some embodiments, interface device 360 may control incoming TV content distribution to multiple (e.g., all) TVs 355 located in customer premises 350. In other embodiments, customer premises 350 may include multiple interface devices that control incoming TV content distribution to different TVs 355.

As previously described, according to an exemplary embodiment, opportunities for addressable ad delivery are identified, and delivery capacity is projected. For example, an MSO platform, such as ad manager 325, optimizes ad insertion in network-designated program breaks based on 1) identified opportunities for ad insertion (using DMA and sub-DMA ad-insertion schedules), and 2) ad-insertion capacity (using hidden channel usage records and collision data), for each network channel in a channel lineup. An exemplary system for managing ad insertion is described below.

Figure 4:
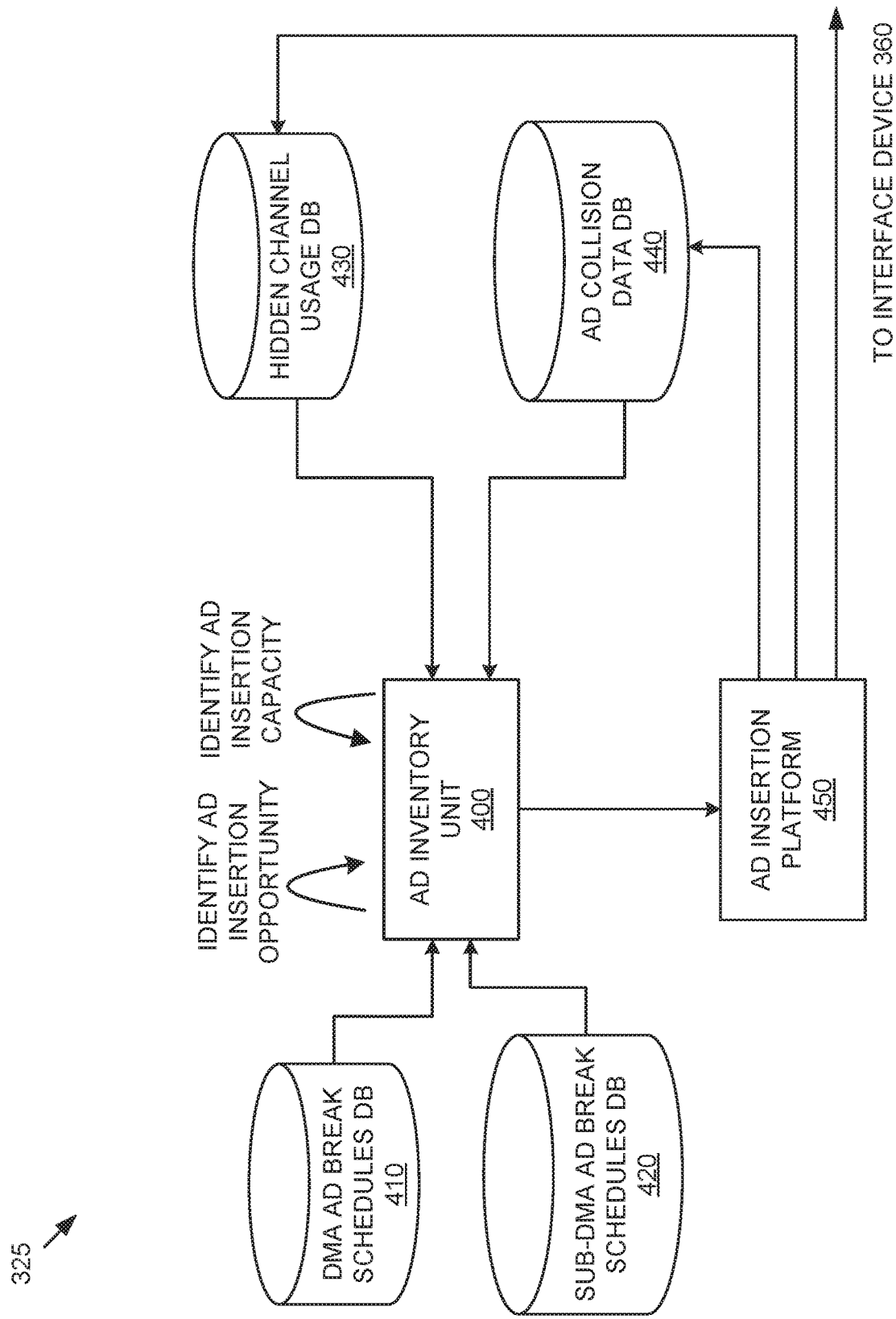
FIG. 4 is a diagram illustrating an exemplary system for managing ad insertion.

FIG. 4 is a diagram illustrating exemplary components of ad manger 325. According to an exemplary embodiment, an ad inventory unit 400 may be configured to retrieve, for an upcoming programming cycle (e.g., next day), ad break schedules from a DMA ad break schedules DB 410 and a sub-DMA ad break schedules DB 420, for each network in a MSO's network lineup. A DMA ad break may correspond to a single regional ad spot that the MSO has committed to deliver via an identified network feed (i.e., channel) during an identified program at a network-designated time during the program. The sub-DMA ad breaks may correspond to multiple local zone ad spots that the MSO has committed to deliver during an identified network program at a network-designated time during the program. The network-designated time may be an approximate time that corresponds to a time window (i.e., indeterminate time). For each local zone, a hidden channel is required to deliver each of the different ad spots during the identified network program.

Ad inventory unit 400 may identify, for each network over the program cycle, scheduled ad breaks for which neither a DMA ad spot nor a sub-DMA ad spot is scheduled to be delivered. Ad inventory unit 400 may determine that one or more of the "open" ad breaks corresponds to an ad insertion opportunity, for example, for insertion of an addressable (or demographic-based or household-level) ad copy of an addressable ad campaign. In some embodiments, a hidden channel is required to deliver each of the different ad spots for each sub-DMA zone and/or addressable segment.

Based on the generated ad insertion opportunity information, identifying opportunities in one or more timeslots during one or more network programs during the upcoming programming cycle, ad inventory unit 400 may retrieve hidden channel (or insertion channel (IC)) usage data from hidden channel usage DB 430. In one embodiment, the hidden channel usage data may include historical usage of the set of ICs (or black channels) across the network lineup for configurable periods (e.g., 10 secs., 30 secs., 1 min., 2 mins., 5 mins., etc.) in a configurable number of previous programming cycles (1 day, 1 week, 2 weeks, etc.). In one embodiment, ad inventory unit 400 retrieves and/or analyzes only the IC usage data corresponding to the upcoming timeslots identified as ad insertion opportunities. Ad inventory unit 400 may compare the ad insertion opportunities in the identified upcoming timeslots to the IC usage data for those timeslots to determine a likelihood of IC availability. In one embodiment, ad inventory unit 400 may calculate a qualitative value (e.g., high, medium, low, etc.) and/or quantitative value (e.g., 0-1, etc.) for the likelihood of IC availability for each of the identified upcoming timeslots. Ad inventory unit 400 may compare the calculated availability value for each of the identified upcoming timeslots to a threshold level.

For an identified upcoming timeslot in which the calculated availability value does not exceed the threshold level, ad inventory unit 400 may determine that the identified upcoming timeslot is not an opportunity for ad insertion. For an identified upcoming timeslot in which the calculated availability value exceeds the threshold level, ad inventory unit 400 may determine that the identified upcoming timeslot is a potential opportunity for ad insertion. Based on such a determination, ad inventory unit 400 may retrieve historical collision data for the identified upcoming timeslots from ad collision data DB 440.

Ad inventory unit 400 may analyze the collision data to calculate a likelihood of a collision occurring on the set of ICs. In one embodiment, the collision data may include historical ad collisions on the set of ICs across the network lineup for configurable periods (e.g., 10 secs., 30 secs., 1 min., 2 mins., 5 mins., etc.) in a configurable number of previous programming cycles (1 day, 1 week, 2 weeks, etc.). In one embodiment, ad inventory unit 400 retrieves and/or analyzes only the ad collision data corresponding to the identified upcoming timeslots determined to be potential opportunities for ad insertion. Ad inventory unit 400 may compare the identified upcoming timeslots to the ad collision data for the identified upcoming timeslots to determine a likelihood of a collision occurring over the set of ICs. In one embodiment, ad inventory unit 400 may calculate a qualitative value for the likelihood of a collision occurring for each of the identified upcoming timeslots. Alternatively or additionally, ad inventory unit 400 may calculate a quantitative value for the likelihood of a collision occurring for each of the identified upcoming timeslots. Ad inventory unit 400 may compare the calculated collision value for each of the identified upcoming timeslots to a threshold level.

For an identified upcoming timeslot in which the calculated collision likelihood value exceeds the threshold level, ad inventory unit 400 may determine that the identified upcoming timeslot is not an opportunity for ad insertion. For an identified upcoming timeslot in which the calculated collision likelihood value does not exceed the threshold level, ad inventory unit 400 may determine that the identified upcoming timeslot is a potential opportunity for ad insertion. Based on such a determination, ad inventory unit 400 may determine multiple candidate network programs during which to insert selected addressable ads.

For example, ad inventory unit 400 may identify one or more criteria, such as network viewership profiles, program viewership profiles, impression-based data, etc., for selecting one or more of the candidate network programs for addressable ad insertion during the identified upcoming timeslot. Ad inventory unit 400 may send to ad insertion platform 450 information indicating the selected network programs, the identified addressable ads, and the upcoming timeslots for inserting the ads. Referring to FIGS. 3 and 4, ad insertion platform 450 may send ad-insertion instructions to interface device 360 to insert the different addressable ads in the identified upcoming timeslot during the identified network program in response to cue and timing information in the program signal. For example, the ad-insertion instructions may include an identifier that identifies the network program, the addressable ad, and/or the identified upcoming timeslot.

According to other implementations, the ad-insertion instructions may include additional, fewer, and/or different information or data. For example, the ad-insertion instructions may include ad targeting information. The ad targeting information may include identifiers that identifier the user, interface device 360, a location of the user (e.g., zip code, etc.), demographics associated with the user (e.g., obtained from subscriber information), and/or other information to select a replacement ad, identifier of a replacement ad, etc., which targets the user. Additionally, or alternatively, the information included in the cue and timing information may form a basis for the information included in the ad-insertion instructions. For example, the cue and timing information may include an ad identifier that identifies the ad, information indicating the number of ads, a length of time of the addressable ad-insertion spot, etc. In this regard, the information included in the ad-insertion instructions may be based on the cue and timing information, which in turn may depend on the agreement between the MVPD and the ad provider and/or a program provider.

Interface device 360 may, based on the received ad-insertion instructions, detect the presence of the cue and timing information pertaining to the identified upcoming timeslot in the program signal. Interface device 360 may insert each addressable ad over a different hidden channel based on, for example, the targeting information. In one embodiment, ad insertion platform 450 may obtain hidden channel usage data during the upcoming programming cycle and provide (e.g., update) the usage data to hidden channel usage DB 430. In one embodiment, Ad insertion platform 450 may obtain ad collision data during the upcoming programming cycle and provide (e.g., update) some or all of the collision data to ad collision DB 440.

Figure 5:
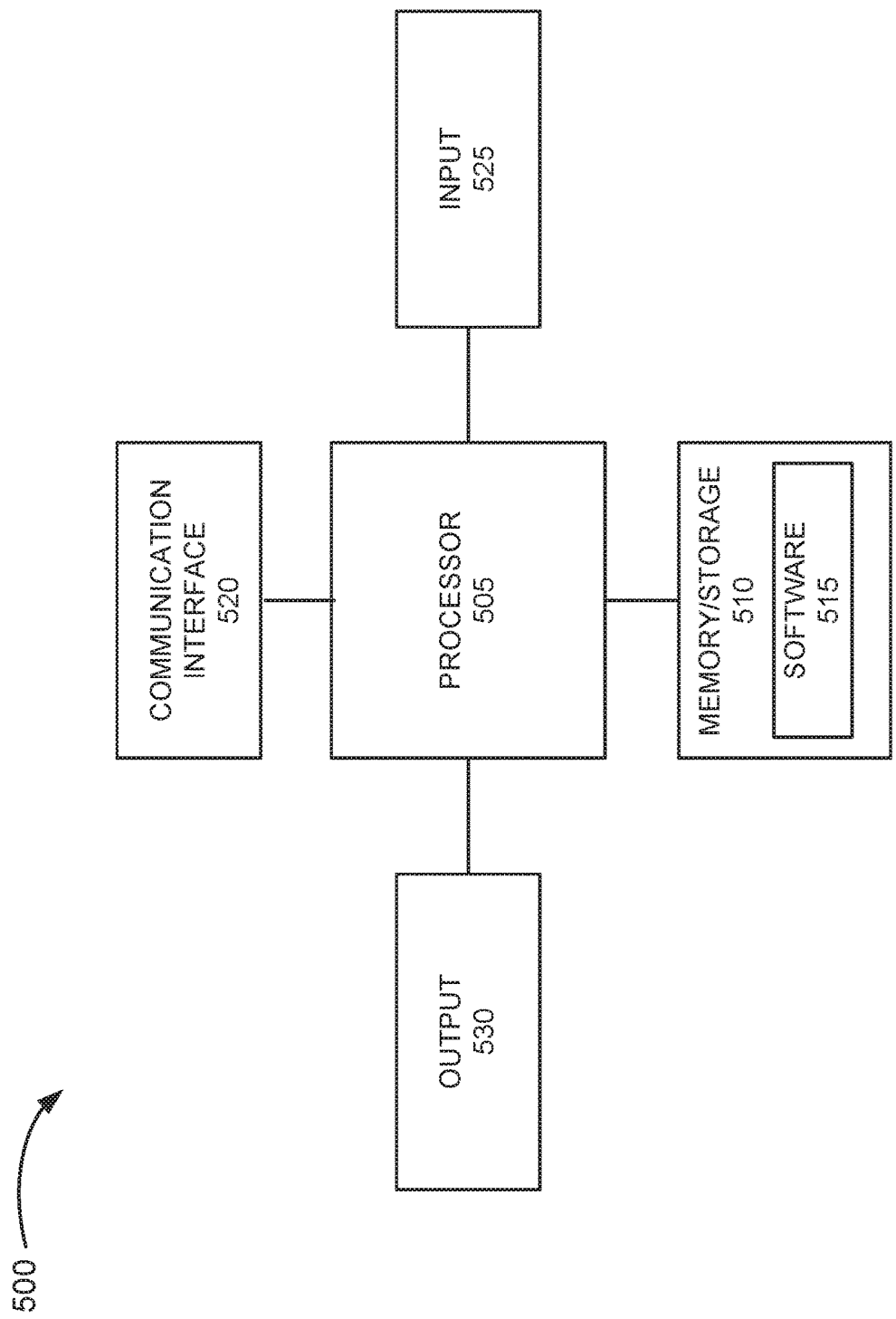
FIG. 5 is a diagram illustrating exemplary components of a device that may correspond to a device previously described.

FIG. 5 is a diagram illustrating exemplary components of a device 500 that may correspond to one or more of the devices in environment 500. As illustrated, according to an exemplary embodiment, device 500 may include a processor 505, memory/storage 510 including software 515, a communication interface 520, an input 525, and an output 530. According to other embodiments, device 500 may include fewer components, additional components, different components, and/or a different arrangement of components than those illustrated in FIG. 5 and described herein.

Processor 505 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 505 may be implemented as hardware (e.g., a microprocessor, etc.), a combination of hardware and software (e.g., a SoC, an ASIC, etc.), may include one or multiple memories (e.g., memory/storage 510), etc.

Processor 505 may control the overall operation or a portion of operation(s) performed by device 500. Processor 505 may perform one or multiple operations based on an operating system and/or software (e.g., software 515). Processor 505 may access instructions from memory/storage 510, from other components of device 500, and/or from a source external to device 500 (e.g., a network, another device, etc.).

Memory/storage 510 includes one or multiple memories and/or one or multiple other types of storage media. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 510 may store data, software, and/or instructions related to the operation of device 500.

Software 515 includes an application or a program that provides one or multiple functions or processes. For example, according to an exemplary embodiment, ad manager 525 and/or interface device 560 include(s) software 515 to provide a function(s) and/or a process(es) described herein. Software 515 may include various forms of firmware (e.g., microcode, data, machine code, etc.).

Communication interface 520 permits device 500 to communicate with other devices, networks, systems, etc. Communication interface 520 may include one or multiple wireless interfaces and/or wired interfaces. Communication interface 520 may include one or multiple transmitters, receivers, and/or transceivers. Communication interface 520 may operate according to one or multiple protocols, standards, and/or the like.

Input 525 permits an input into device 500. For example, input 525 may include a keyboard, a mouse, a display, a touchscreen, a touchless screen, a button, a switch, an input port, speech recognition logic, and/or some other type of visual, auditory, tactile, etc., input component. Output 530 permits an output from device 500. For example, output 530 may include a speaker, a display, a touchscreen, a touchless screen, a light, an output port, and/or some other type of visual, auditory, tactile, etc., output component.

Device 500 may perform a process(es) and/or a function(s), as described herein, in response to processor 505 executing instructions (e.g., software 515) stored by memory/storage 510. By way of example, instructions may be read into memory/storage 510 from another memory/storage 510 or from another device via communication interface 520. The instructions stored by memory/storage 510 may cause processor 505 to perform a process or a function, as described herein. Alternatively, for example, according to other implementations, device 500 may perform a process or a function based on the execution of hardware (processor 505, etc.), the execution of firmware with hardware, or the execution of software and firmware with hardware.

Figure 6:
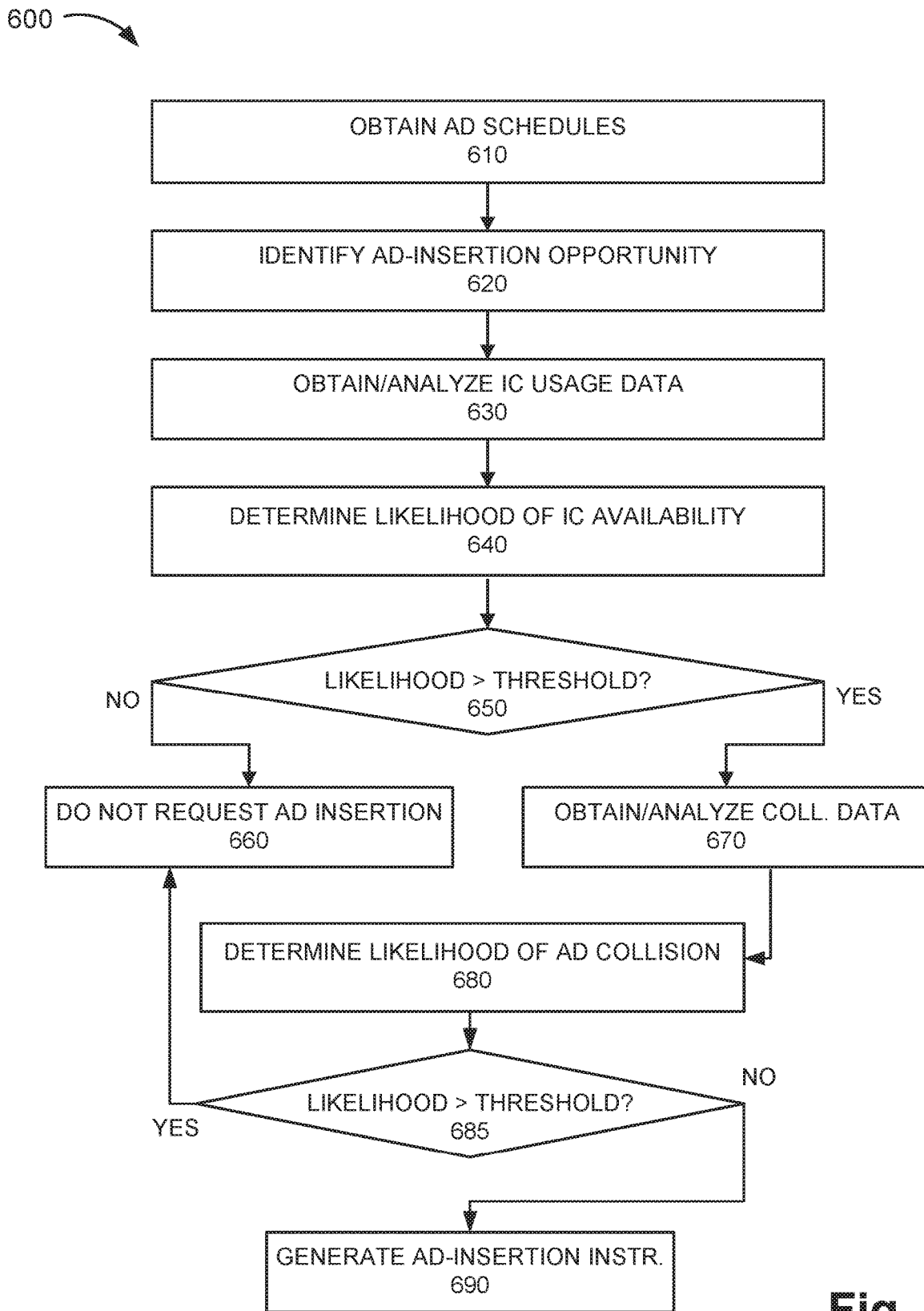
FIG. 6 is a flow diagram illustrating an exemplary process for managing ad insertion.

FIG. 6 is a flow diagram illustrating an exemplary process 600 for optimizing resource usage for ad delivery based on probabilistic-based, projection of channel availability. According to an exemplary embodiment, process 600 is performed by ad manager 325. For example, processor 505 executes software 515 to perform process 600.

Referring to FIG. 6, block 610, process 600 may include ad manager 325 obtaining (e.g., retrieving and/or receiving) regional ad break information and local zone ad break information. For example, as previously described, ad inventory unit 400 may receive ad break schedules from DMA ad break schedules DB 410, and local zone ad breaks schedules from sub-DMA ad break schedules DB 420 for an upcoming programming cycle for each network in an MSO's network lineup.

In block 620, process 600 may include ad manager 325 identifying ad-spot insertion opportunities in one or more upcoming programming timeslots on one or more networks. For example, as previously described, the MSO may have rights to insert ads for up to 2 minutes per nominal programming hour on all or most of the networks in the MSO's network lineup. Where scheduled regional ads and local zone ads do not account for the whole 2 mins. (e.g., 30 secs., 1 min., etc.) in any network programming hour, ad inventory unit 600 may flag that hour as a potential ad-spot for inserting an addressable (e.g., household-level) ad, for example, as part of a targeted ad campaign, in a corresponding upcoming programming timeslot.

If one or more ad insertion opportunities are identified, ad manager 325 may obtain insertion channel usage data (block 630). For example, as previously described, ad inventory unit 600 may retrieve from hidden channel usage DB 430 insertion channel usage data for a configurable number of previous network programming cycles corresponding to the upcoming programming timeslot. According to one embodiment, ad inventory unit 600 may analyze the data to identify insertion channel availability with respect to the entire set of insertion channels in the MSO's distribution system. Based on the analysis, ad inventory unit 600 may determine a likelihood of availability of an insertion channel for delivering an ad during the upcoming programming timeslot (block 640). In one embodiment, process 600 includes a determination, for example, by ad inventory unit 600, whether the likelihood of availability exceeds a threshold level (block 650). In one embodiment, the threshold level may be determined by the MSO and/or ad manager 325.

If it is determined that the threshold for insertion channel availability is not exceeded (block 650—NO), then ad insertion capacity is lacking and no ad insertion will be requested for the upcoming network programming timeslot (beyond what regional and/or local zone ads may be scheduled for that upcoming network programming timeslot) (block 660).

If it is determined that the likelihood of availability of at least one hidden channel of the set of hidden channels during the upcoming programming timeslot exceeds the threshold level (block 650—YES), then ad manger 325 may obtain ad collision data (block 670). For example, as previously described, ad inventory unit 600 may retrieve from ad collision DB 440 ad collision data for a configurable number of previous network programming cycles corresponding to the upcoming programming timeslot. According to one embodiment, ad inventory unit 600 may analyze the data to identify past ad collisions occurring on the set of insertion channels in the MSO's distribution system. Based on the analysis, ad inventory unit 600 may determine a likelihood of collision occurring on an insertion channel delivering an ad during the upcoming programming timeslot (block 680). In one embodiment, process 600 includes a determination, for example, by ad inventory unit 600, whether the likelihood of availability exceeds a threshold level (block 685). In one embodiment, the threshold level may be determined by the MSO and/or ad manager 325.

If it is determined that the threshold is exceeded (block 685—YES), then no ad insertion request is to be made (block 660). If it is determined that the likelihood of an ad collision occurring is below the threshold level (block 685—YES), then an ad insertion instruction is generated and transmitted to interface 360, for example, as previously described (block 690).

Although FIG. 6 illustrates an exemplary process 600 for hidden channel-optimizing ad insertion in an MSO's network TV distribution system, according to other embodiments, process 600 may include additional operations, fewer operations, and/or different operations than those described and illustrated in FIG. 6.

For example, the MSO may designate, in its network channel lineup, a set of first-tier network channels, and a lower-tier set of network channels (e.g., "long-tail networks"). Ad manager 325 may, for example, schedule regional (DMA), local zone (sub-DMA), and addressable (demographic-based) ad spots for insertion in/delivery over any of the first-tier networks, while scheduling only regional (DMA) ad spots for delivery over any of the lower-tier networks. However, in implementing the collision-avoidance-based ad insertion process described above, ad manager 325 may include the lower-tier networks in determining ad-insertion opportunities, and scheduling addressable ad insertion based on available opportunities with respect to the lower-tier networks.

As a result of the foregoing technological solution, more efficient use of various resources (e.g., storage, communication interfaces, processors, communication links, etc.) in an MVPD's distribution system minimizes ad collision, and optimizes hidden channel usage in customer premises equipment (e.g., set-top boxes) for ad delivery.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of operations have been described with respect to FIG. 6, the order of the operations and/or signal flows may be modified in other implementations. Further, non-dependent operations/signaling may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or an FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method comprising:
   identifying, by an ad insertion device, at least one prospect for inserting a selected ad via a set of hidden channels during a target programming timeslot based on ad schedules for a plurality of networks;
   determining, by the ad insertion device and based on hidden channel usage data for a programming timeslot corresponding to the target programming timeslot, that a likelihood of availability of at least one hidden channel of the set of hidden channels during the target programming timeslot exceeds a first threshold level; and
   sending, by the ad insertion device, an instruction to an interface device to insert the selected ad via the at least one hidden channel during the target programming timeslot.

2. The method of claim 1, wherein the plurality of networks comprises a set of first-tier networks and a set of lower-tier networks, the method further comprising:
   determining, based on ad insertion collision data for the programming timeslot, that a likelihood of a collision occurring on the set of hidden channels during the target programming timeslot is below a second threshold level,
   wherein sending the instruction is based on the determination that a likelihood of availability of the at least one hidden channel exceeds the first threshold level and based on the determination that the likelihood of the collision is below the second threshold level.

3. The method of claim 2, wherein the ad schedules identify:
   a plurality of designated market area (DMA) ads for insertion via the set of first-tier networks and the set of lower-tier networks; and
   a plurality of sub-DMA ads for the first-tier networks, wherein the sub-DMA ads are to be delivered via the set of hidden channels to a sub-DMA associated with the DMA.

4. The method of claim 3, wherein the selected ad comprises an impression-based ad associated with the sub-DMA.

5. The method of claim 3, wherein the selected ad comprises a demographic-based ad associated with a division of the sub-DMA, the method further comprising:
   identifying a plurality of users within the division of the sub-DMA based on demographic criteria defined for the demographic-based ad.

6. The method of claim 2, wherein the selected ad is to be inserted in the target programming timeslot of one of the set of lower-tier networks.

7. The method of claim 1, further comprising:
   monitoring the programming timeslot to identify ad insertion collisions that occur on the set of hidden channels; and
   generating the ad insertion collision data based on the monitoring.

8. A device comprising:
   a communication interface;
   one or more memories that store instructions; and
   one or more processors to execute the instructions to:
      identify, based on ad schedules for a plurality of networks, at least one prospect for inserting a selected ad via a set of hidden channels during a target programming timeslot;
      determine, based on hidden channel usage data for a programming timeslot corresponding to the target programming timeslot, that a likelihood of availability of at least one hidden channel of the set of hidden channels during the target programming timeslot exceeds a first threshold level; and
      send, via the communication interface, an instruction to an interface device to insert the selected ad via the at least one hidden channel during the target programming timeslot.

9. The device of claim 8, wherein the plurality of networks comprises a set of first-tier networks and a set of lower-tier networks, and the one or more processors further execute the instructions to:
   determine, based on ad insertion collision data for the programming timeslot, that a likelihood of a collision occurring on the set of hidden channels during the target programming timeslot is below a second threshold level,
   wherein sending the instruction is based on the determination that a likelihood of availability of the at least one hidden channel exceeds the first threshold level and based on the determination that the likelihood of the collision is below the second threshold level.

10. The device of claim 9, wherein the ad schedules identify:
    a plurality of designated market area (DMA) ads for insertion via the set of first-tier networks and the set of lower-tier networks; and
    a plurality of sub-DMA ads for the first-tier networks, wherein the sub-DMA ads are to be delivered via the set of hidden channels to a sub-DMA associated with the DMA.

11. The device of claim 10, wherein the selected ad comprises an impression-based ad associated with the sub-DMA.

12. The device of claim 10, wherein the selected ad comprises a demographic-based ad associated with a division of the sub-DMA, and the one or more processors further execute the instructions to:
identify a plurality of users within the division of the sub-DMA based on demographic criteria defined for the demographic-based ad.

13. The device of claim 9, wherein the selected ad is to be inserted in the target programming timeslot of one of the set of lower-tier networks.

14. The device of claim 8, wherein the device comprises an ad insertion device implemented in a service provider network.

15. A non-transitory storage medium storing instructions executable by a device to:
identify, based on ad schedules for a plurality of networks, at least one prospect for inserting a selected ad via a set of hidden channels during a target programming timeslot;
determine, based on hidden channel usage data for a programming timeslot corresponding to the target programming timeslot, that a likelihood of availability of at least one hidden channel of the set of hidden channels during the target programming timeslot exceeds a first threshold level; and
send an instruction to an interface device to insert the selected ad via the at least one hidden channel during the target programming timeslot.

16. The non-transitory storage medium of claim 15, wherein the plurality of networks comprises a set of first-tier networks and a set of lower-tier networks, wherein the instructions further cause the device to:
determine, based on ad insertion collision data for the programming timeslot, that a likelihood of a collision occurring on the set of hidden channels during the upcoming programming timeslot is below a second threshold level,
wherein sending the instruction is based on the determination that a likelihood of availability of the at least one hidden channel exceeds the first threshold level and based on the determination that the likelihood of the collision is below the second threshold level.

17. The non-transitory storage medium of claim 16, wherein the ad schedules identify:
a plurality of designated market area (DMA) ads for insertion via the set of first-tier networks and the set of lower-tier networks; and
a plurality of sub-DMA ads for the first-tier networks, wherein the sub-DMA ads are to be delivered via the set of hidden channels to a sub DMA associated with the DMA.

18. The non-transitory storage medium of claim 17, wherein the selected ad comprises an impression-based ad associated with the sub-DMA.

19. The non-transitory storage medium of claim 17, wherein the selected ad comprises a demographic-based ad associated with a division of the sub-DMA, further storing instructions executable by the device to:
identify a plurality of users within the division of the sub-DMA based on demographic criteria defined for the demographic-based ad.

20. The non-transitory storage medium of claim 16, wherein the selected ad is to be inserted in the target programming timeslot of one of the set of lower-tier networks.

* * * * *